(12) United States Patent
Park et al.

(10) Patent No.: US 9,337,721 B2
(45) Date of Patent: May 10, 2016

(54) CORRECTION CIRCUIT LIMITING INRUSH CURRENT

(71) Applicant: LSIS CO., LTD., Anyang-si, Gyeonggi-do (KR)

(72) Inventors: Chan Gi Park, Anyang-si (KR); Jae Ho Lee, Bucheon-si (KR); Ho Sang Jin, Ansan-si (KR)

(73) Assignee: LSIS CO., LTD., Anyang-si (KR)

( * ) Notice: Subject to any disclaimer, the term of this patent is extended or adjusted under 35 U.S.C. 154(b) by 144 days.

(21) Appl. No.: 14/192,664

(22) Filed: Feb. 27, 2014

(65) Prior Publication Data
US 2015/0062986 A1 Mar. 5, 2015

(30) Foreign Application Priority Data

Sep. 2, 2013 (KR) ........................ 10-2013-0104934

(51) Int. Cl.
*H02M 1/42* (2007.01)
*H02M 7/06* (2006.01)
*H02M 7/12* (2006.01)

(52) U.S. Cl.
CPC .......... *H02M 1/4208* (2013.01); *H02M 1/4225* (2013.01); *H02M 7/062* (2013.01); *H02M 7/125* (2013.01); *Y02B 70/126* (2013.01)

(58) Field of Classification Search
CPC .... H02M 1/4225; H02M 7/04; H02M 1/4208
See application file for complete search history.

(56) References Cited

U.S. PATENT DOCUMENTS

| RE27,128 | E | * | 6/1971 | Morgan | .................. H02M 1/06 363/124 |
| 3,781,637 | A | * | 12/1973 | Potter | ................... H02M 7/517 323/908 |
| 4,800,329 | A | * | 1/1989 | Masaki | .................. H05B 39/02 315/DIG. 7 |
| 5,430,364 | A | * | 7/1995 | Gibson | ..................... G05F 1/70 323/207 |
| 5,563,781 | A | * | 10/1996 | Clauter | ............... H02M 1/4225 363/124 |

(Continued)

FOREIGN PATENT DOCUMENTS

| CN | 202634299 | 12/2012 |
| JP | 07-231662 | 8/1995 |

(Continued)

OTHER PUBLICATIONS

Korean Intellectual Property Office Application Serial No. 10-2013-0104934, Office Action dated Sep. 17, 2014, 4 pages.

(Continued)

*Primary Examiner* — Timothy J Dole
*Assistant Examiner* — Yusef Ahmed
(74) *Attorney, Agent, or Firm* — Lee Hong Degerman Kang & Waimey; Jonathan Kang; Jeffrey Lotspeich

(57) ABSTRACT

Provided is a power factor correction circuit correcting a power factor of AC voltage. The power factor correction circuit includes: a rectifying unit stopping rectifying the AC voltage in a transient state and generating an rectified voltage by rectifying the AC voltage in a steady state; a power factor correction unit generating a power-factor-corrected voltage by correcting the rectified voltage; a smoothing unit generating a smoothed voltage by smoothing the power-factor-corrected voltage; and an inrush current limiting unit providing a limited current by limiting an inrush current generated by the AC voltage in the transient state and stopping providing a current to the smoothing unit.

14 Claims, 9 Drawing Sheets

(56) References Cited

U.S. PATENT DOCUMENTS

| | | | | |
|---|---|---|---|---|
| 5,572,416 | A * | 11/1996 | Jacobs | H02M 1/4225 323/222 |
| 5,654,661 | A * | 8/1997 | Kammiller | H03K 17/725 327/438 |
| 6,055,167 | A * | 4/2000 | Shamkovich | H02M 1/4225 323/300 |
| 6,153,851 | A * | 11/2000 | Schneider | B23K 9/1043 219/121.39 |
| 6,493,245 | B1 * | 12/2002 | Phadke | H02H 9/001 323/908 |
| 2005/0105311 | A1 | 5/2005 | Soldano | H02M 1/4225 363/89 |
| 2006/0022648 | A1 * | 2/2006 | Ben-Yaakov | H02M 1/4225 323/222 |
| 2006/0033480 | A1 * | 2/2006 | Soldano | H02M 3/1588 323/225 |
| 2006/0232253 | A1 * | 10/2006 | Salato | H02M 1/36 323/225 |
| 2006/0274468 | A1 * | 12/2006 | Phadke | H02M 7/125 361/93.1 |
| 2007/0182338 | A1 * | 8/2007 | Shteynberg | H05B 33/0815 315/200 R |
| 2010/0213859 | A1 * | 8/2010 | Shteynberg | H05B 33/0815 315/224 |
| 2011/0227522 | A1 * | 9/2011 | Shinomoto | H02M 1/4225 318/400.29 |
| 2011/0309759 | A1 * | 12/2011 | Shteynberg | H05B 33/0815 315/201 |
| 2012/0212144 | A1 * | 8/2012 | Hayashi | H05B 33/089 315/193 |
| 2013/0135911 | A1 * | 5/2013 | Lee | H02M 7/04 363/126 |
| 2013/0162224 | A1 * | 6/2013 | Eckel | H05B 33/0815 323/205 |
| 2013/0223120 | A1 * | 8/2013 | Dragojevic | H02M 7/06 363/126 |
| 2013/0308356 | A1 * | 11/2013 | Subramanium | H02J 5/00 363/53 |
| 2013/0342139 | A1 * | 12/2013 | Shimomugi | H02M 7/066 318/400.3 |
| 2014/0091720 | A1 * | 4/2014 | Brinlee | H05B 37/02 315/186 |

FOREIGN PATENT DOCUMENTS

| | | |
|---|---|---|
| JP | 10-117475 | 5/1998 |
| JP | 2001-161071 | 6/2001 |
| JP | 2005-057947 | 3/2005 |
| JP | 2005-295649 | 10/2005 |
| JP | 2006-276341 | 10/2006 |
| JP | 2012-175833 | 9/2012 |
| KR | 10-2010-0023302 | 3/2010 |

OTHER PUBLICATIONS

European Patent Office Application Serial No. 14160651.7 Search Report dated May 6, 2015, 8 pages.
Japan Patent Office Application Serial No. 2014-063528, Office Action dated Apr. 28, 2015, 3 pages.
Korean Intellectual Property Office Application Serial No. 10-2013-0104934, Notice of Allowance dated Sep. 24, 2015, 2 pages.

* cited by examiner

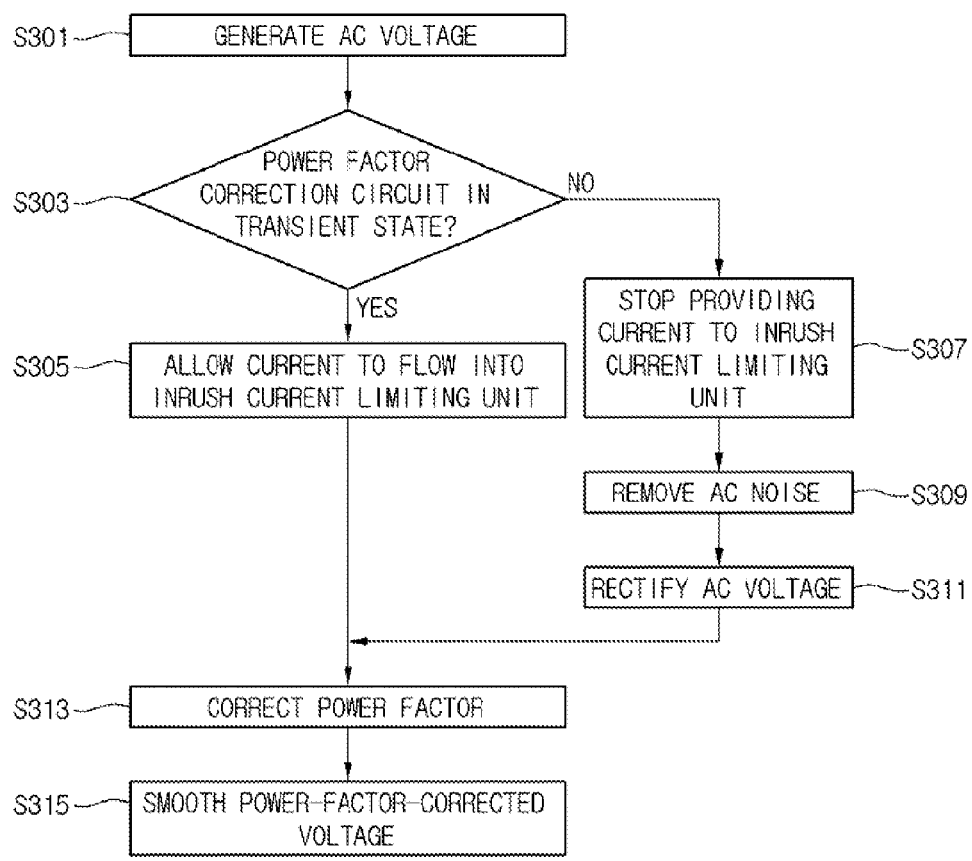

CORRECTION CIRCUIT LIMITING INRUSH CURRENT

CROSS-REFERENCE TO RELATED APPLICATIONS

Pursuant to 35 U.S.C. §119(a), this application claims the benefit of earlier filing date and right of priority to Korean Application No. 10-2013-0104934, filed on Sep. 2, 2013, the contents of which is incorporated by reference herein in its entirety.

BACKGROUND

The present disclosure relates to a power factor correction circuit protecting circuit devices by limiting inrush current occurring at the initial state of AC power connection.

Since the phases of voltage and current are not necessarily equal to each other in an AC circuit, all the products thereof are not becoming actual power to be used. A ratio of the product of voltage and current and active power, i.e., actual power to be used, is referred to as a power factor. If the power factor is small, since that much of transmission power loss occurs, a power factor correction circuit for preventing the loss is widely used for various electronic devices. Additionally, the installation of such a power factor correction circuit becomes mandatory in some countries.

A charging device for charging a battery of an electric vehicle requires a power factor correction circuit. At the initial charging of a battery, since a capacitor of a smoothing unit in a power factor correction circuit is not charged yet, inrush current occurs. The inrush current refers to a flowing current higher than normal current when power is applied to a distribution line or an electronic device. In relation to the inrush current, as soon as power is on, current corresponding to several times or several ten times normal current flows and decreases gradually and then, disappears when a steady state is reached. If such an inrush current flows as it is, current higher than the maximum allowable current of devices in a circuit flows. As result, malfunction and failure may occur. Accordingly, a device for limiting inrush current is required.

SUMMARY

Embodiments provide a power factor correction circuit for protecting devices in a circuit from an inrush current occurring at the initial state of applying AC voltage when a power factor correction circuit such as an electric vehicle charging device is used.

In one embodiment, a power factor correction circuit correcting a power factor of AC voltage includes: a rectifying unit stopping rectifying the AC voltage in a transient state and generating an rectified voltage by rectifying the AC voltage in a steady state; a power factor correction unit generating a power-factor-corrected voltage by correcting the rectified voltage; a smoothing unit generating a smoothed voltage by smoothing the power-factor-corrected voltage; and an inrush current limiting unit providing a limited current by limiting an inrush current generated by the AC voltage in the transient state and stopping providing a current to the smoothing unit.

In another embodiment, a power factor correction circuit includes: a plurality of bridge diodes; a power factor correction unit having an input terminal connected to an output terminal of the plurality of bridge diodes; a smoothing capacitor having one end connected to an output terminal of the power factor correction unit; a switch having one end to which AC voltage is applied; a diode having one end connected to the other end of the switch; a resistor having one end connected to the other end of the diode; and a current control signal generation unit turning on the switch in a transient state and preventing a current from flowing into two upper bridge diodes among the plurality of bridge diodes to allow the resistor to provide a limited size of current to the smoothing capacitor.

In further another embodiment, a method of operating a power factor correction circuit correcting a power factor of AC voltage includes: determining whether the power factor correction circuit is in a transient state; limiting a inrush current generated by the AC voltage when the power factor correction circuit in the transient state; generating a rectified voltage by rectifying the AC voltage when the power factor correction circuit is in a steady state; generating a power-factor-corrected voltage by power-factor-correcting the rectified voltage; and generating a smoothed voltage by smoothing the power-factor-corrected voltage.

The details of one or more embodiments are set forth in the accompanying drawings and the description below. Other features will be apparent from the description and drawings, and from the claims.

BRIEF DESCRIPTION OF THE DRAWINGS

FIG. 9 is a flowchart illustrating operations of a power factor correction circuit according to another embodiment of the present invention.

DETAILED DESCRIPTION OF THE EMBODIMENTS

Figure 1:
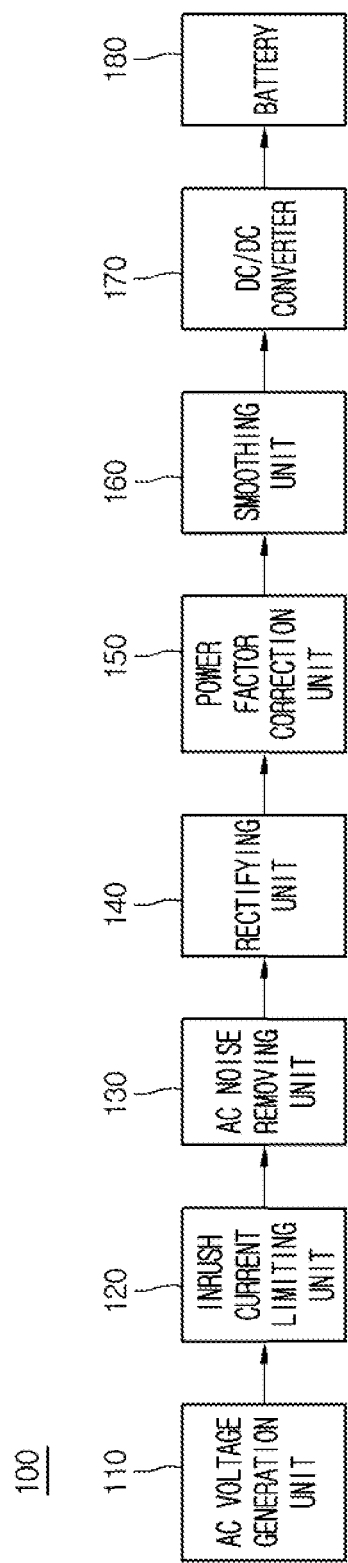
FIG. 1 is a block diagram illustrating a power factor correction circuit according to an embodiment of the present invention.

Hereinafter, embodiments of the present invention will be described in more detail with reference to the accompanying drawings, in order to allow those skilled in the art to easily realize the present invention. The present invention may be realized in different forms, and is not limited to the embodiments described herein. Moreover, detailed descriptions related to well-known functions or configurations will be ruled out in order not to unnecessarily obscure subject matters of the present invention. Like reference numerals refer to like elements throughout.

Moreover, throughout the specification, the meaning of "include", "comprise", "including", or "comprising" specifies a property, a region, a fixed number, a step, a process, an element and/or a component but does not exclude other properties, regions, fixed numbers, steps, processes, elements and/or components.

Hereinafter, a power factor correction circuit according to an embodiment of the present invention will be described with reference to FIGS. 1 to 3.

FIG. 1 is a block diagram illustrating a power factor correction circuit according to an embodiment of the present invention.

Referring to FIG. 1, the power factor correction circuit 100 includes an AC voltage generation unit 110, an inrush current limiting unit 120, an AC noise removing unit 130, a rectifying unit 140, a power factor correction unit 150, a smoothing unit 160, a DC/DC converter 170, and a battery 180.

The power factor correction unit 150 corrects a power factor.

The DC/DC converter 170 converts smoothed voltage into a size of voltage required for charging.

The battery 180 is charged by the converted voltage.

Other components of the power factor correction circuit 100 will be described in more detail with reference to FIG. 2.

Figure 2:
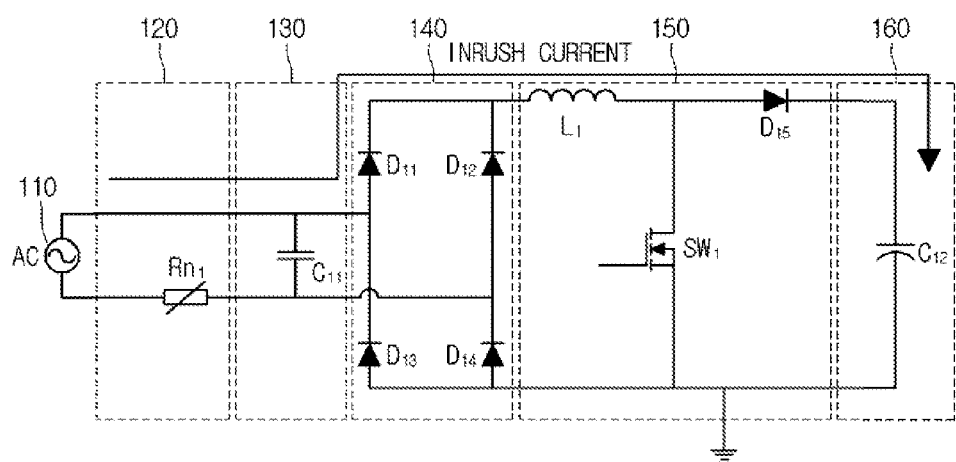
FIG. 2 is a circuit diagram illustrating a power factor correction circuit according to an embodiment of the present invention.

FIG. 2 is a circuit diagram illustrating a power factor correction circuit according to an embodiment of the present invention.

The AC voltage generation unit 110 generates AC voltage.

The inrush current limiting unit 120 includes a Negative Temperature Coefficient (NTC) thermistor Rn1. The NTC thermistor Rn1 has one end at which an AC voltage generated at one end of the AC voltage generation unit 110 is applied.

The NTC thermistor Rn1 refers to a thermistor having a negative temperature coefficient and a continuously changing electrical resistance. When inrush current occurs when AC voltage is supplied to a circuit first, since a temperature is low in the circuit, the NTC thermistor Rn1 has a high resistance value. Accordingly, due to the resistance value of the NTC thermistor Rn1, since the size of an internal resistance in the circuit increases, the size of inrush current is reduced according to the Ohm's law (i.e., V=IR(V: voltage I: current R: resistance)). Through this, devices in the circuit may be protected from inrush current. Additionally, when the circuit enters a steady state, since a temperature in the circuit increases, the NTC thermistor Rn1 has a very small resistance value. Therefore, the size of an equivalent resistance in the circuit has no significant difference compared to the case that the NTC thermistor Rn1 is not connected, so that the inrush current limiting unit 120 less affects original functions of a power factor correction circuit in a steady state. The steady state refers to a stable state reached ultimately after a transient response disappears.

The AC noise removing unit 130 includes a capacitor C11. One end of the capacitor C11 is connected to the other end of the NTC thermistor Rn1 and the other one of the capacitor C11 is connected to the other end of the AC voltage generation unit 110. The AC voltage generation unit 130 removes the noise of AC voltage.

The rectifying unit 140 may include a plurality of diodes. As shown in FIG. 2, the rectifying unit 140 includes four diodes. The four diodes are bridge-connected. The bottom left diode D13 among the bridge-connected four diodes has one end connected to the other end of the capacitor C11 of the AC noise removing unit 130 and the other end grounded. The bottom right diode D14 among the bridge-connected four diodes has one end connected to one end of the capacitor C11 of the AC noise removing unit 130 and the other end grounded. The top left diode D11 among the bridge-connected four diodes has one end connected to the other end of the capacitor C11 of the AC noise removing unit 130 and the other end connected to one end of the bottom left diode D13. The top right diode D12 among the bridge-connected four diodes has one end connected to the other end of the top diode D11 and the other end connected to one end of the bottom right diode D14. The rectifying unit 140 rectifies an AC voltage having noise removed to have the same polarity and outputs it.

The power factor correction unit 150 includes an inductor L1, a MOSFET switch SW1, and a diode D15. One end of the inductor L1 is connected to one end of the top right diode D12 in the rectifying unit 140. One end of the MOSFET switch SW1 is connected to the other end of the inductor L1 and the other end of the MOSFET switch SW1 is grounded. One end of the diode D15 is connected to the other end of the inductor L1. The power factor correction unit 150 generates a power-factor-corrected voltage by power-factor-correcting the rectified voltage. The power factor correction unit 150 may be specifically a booster converter. The booster converter performs switching repeatedly to maintain the size of a rectified voltage to be constant and make the phases of current and voltage identical. That is, the flow of current is adjusted through a method of allowing current to flow for a predetermined time and then stop for a predetermined time. Through such an operation for making the phase of voltage identical to the phase of current, a power factor is corrected.

The smoothing unit 160 includes one capacitor C12. Especially, the capacitor C12 may be an electrolytic condenser. One end of the capacitor C12 is connected to the other end of the diode D15 and the other end of the capacitor C12 is grounded. According to an embodiment of the present invention, the smoothing unit 160 may include a plurality of capacitors. One end of each of the plurality of capacitors is connected to the other end of the diode D15 and the other end of each of the plurality of capacitors is grounded. The smoothing unit 160 generates DC voltage by removing a ripple from the power-factor-corrected voltage. That is, the smoothing unit 160 smoothes the power-factor-corrected voltage.

In such an embodiment, if a temperature of an NTC thermistor increases, the NTC thermistor has a small resistance value. However, since a resistance value of an NTC thermistor does not disappear completely, power loss not relating to power factor correction occurs, so that the efficiency of the power factor correction circuit is reduced.

Figure 3:
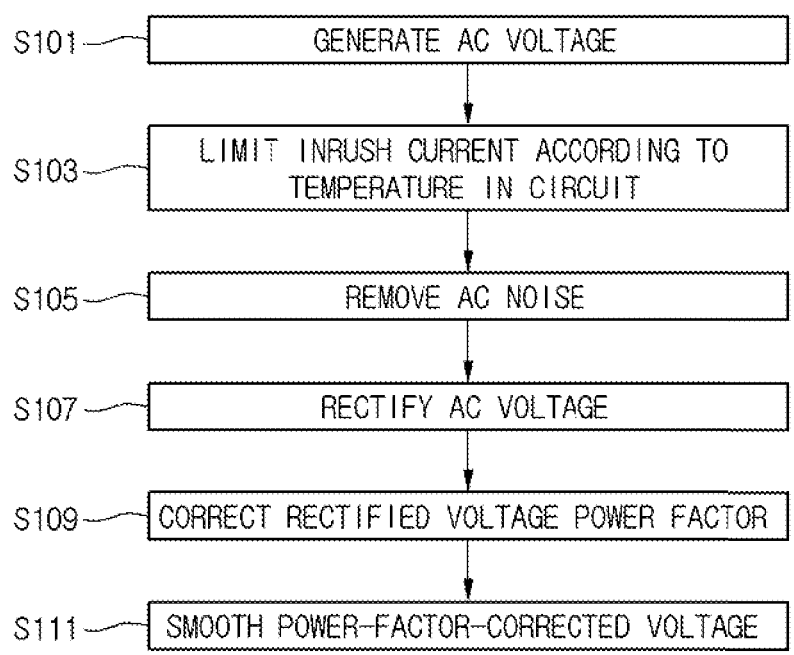
FIG. 3 is a flowchart illustrating operations of a power factor correction circuit according to an embodiment of the present invention.

FIG. 3 is a flowchart illustrating operations of a power factor correction circuit according to an embodiment of the present invention.

The AC voltage generation unit 110 generates AC voltage in operation S101.

The inrush current limiting unit 120 limits inrush current according to a temperature of the NTC thermistor Rn1 in operation S103. A resistance value of the NTC thermistor Rn1 varies according to a temperature. Accordingly, inrush is limited at a low temperature when a resistance value of the NTC thermistor Rn1 is high and also is limited due to a low temperature at the initial time of applying AC voltage.

The AC noise removing unit 130 removes the noise of AC voltage in operation S105.

The rectifying unit 140 rectifies an AC voltage having noise removed to generate the rectified voltage in operation S107.

The power factor correction unit 150 generates a power-factor-corrected voltage by power-factor-correcting the rectified voltage in operation S109.

The smoothing unit 160 smoothes the power-factor-corrected voltage in operation S111.

Hereinafter, a power factor correction circuit according to another embodiment of the present invention will be described with reference to FIGS. 4 to 6.

Figure 4:
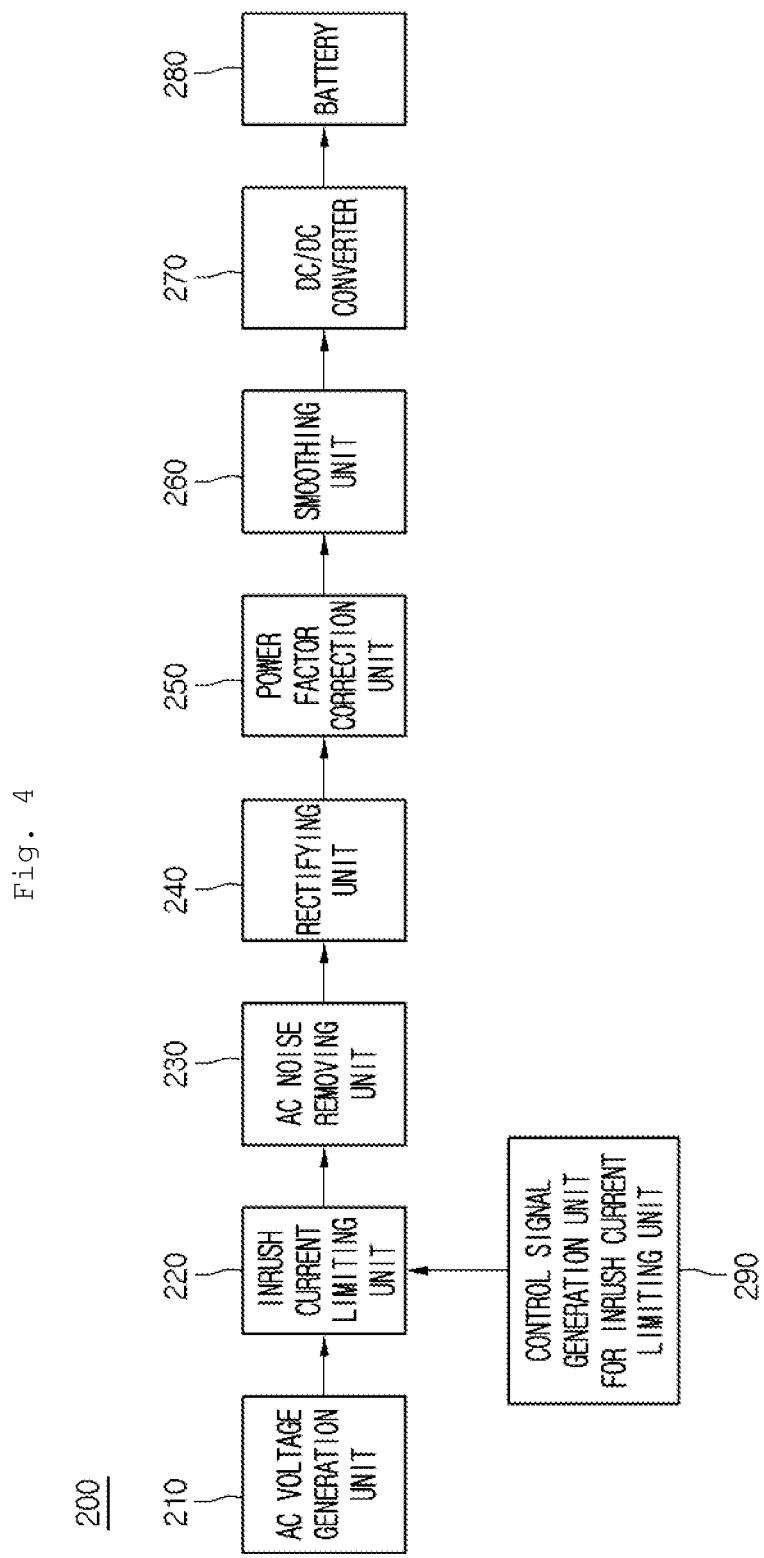
FIG. 4 is a block diagram illustrating a power factor correction circuit according to another embodiment of the present invention.

FIG. 4 is a block diagram illustrating a power factor correction circuit according to another embodiment of the present invention.

The power factor correction circuit 200 includes an AC voltage generation unit 210, an inrush current limiting unit 220, an AC noise removing unit 230, a rectifying unit 240, a power factor correction unit 250, a smoothing unit 260, a DC/DC converter 270, a battery 280, and a control signal generation unit for inrush current limiting unit 290. Except that the power factor correction circuit 200 includes the control signal generation unit for inrush current limiting unit 290, other components are identical to those of FIG. 1.

The control signal generation unit for inrush current limiting unit 290 generates a control signal and controls a switch in the inrush current limiting unit 220.

Other components of the power factor correction circuit 200 will be described in more detail with reference to FIG. 5.

Figure 5:
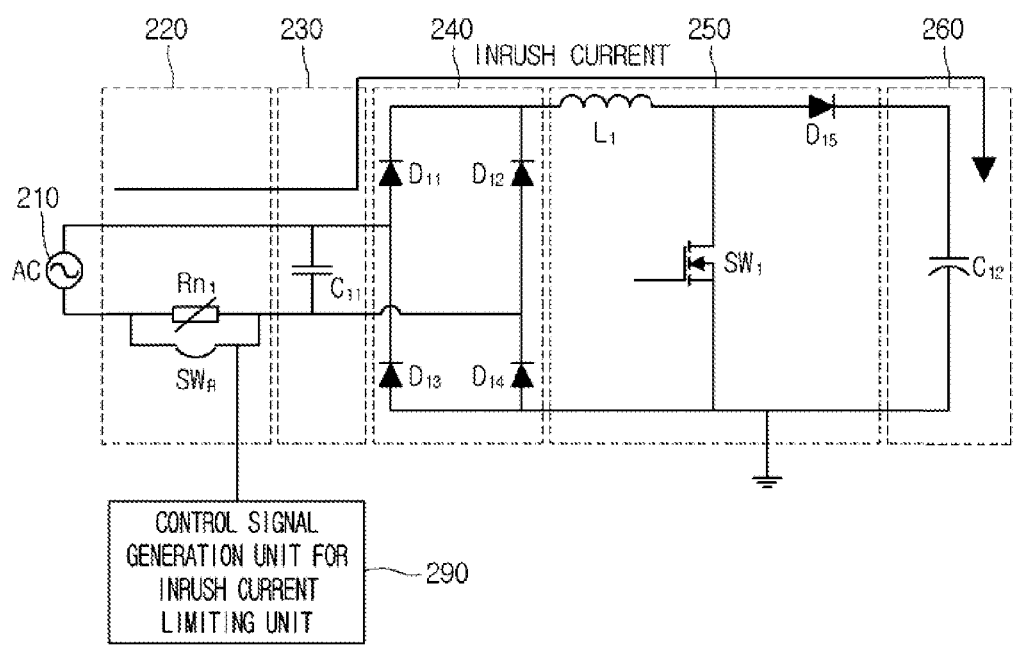
FIG. 5 is a circuit diagram illustrating a power factor correction circuit according to another embodiment of the present invention.

FIG. 5 is a circuit diagram illustrating a power factor correction circuit according to another embodiment of the present invention.

Except for the circuit of the inflow current limiting unit 220, the circuit diagram of FIG. 5 is identical to the circuit diagram of FIG. 2 and as described with reference to FIG. 4, the circuit diagram of FIG. 5 further includes the control signal generation unit for inrush current limiting unit 290.

In the embodiment of FIG. 5, the inrush current limiting unit 220 includes a relay switch SWR and a NTC thermistor Rn1. The NTC thermistor Rn1 has one end to which AC voltage is applied and the other end connected to one end of the capacitor C11 of the AC noise removing unit 230. The relay switch SWR has one end to which AC voltage is applied and the other end connected to one end of the capacitor C11 of the AC noise removing unit 230.

The relay switch SWR is controlled by a control signal for inrush current limiting unit. When inrush current flows at the initial time of applying AC voltage, the control signal generation unit for inrush current limiting unit 290 turns off the relay switch SWR to limit inrush current. When the circuit reaches a steady state, since inrush current is not likely to occur, the control signal generation unit for inrush current limiting unit 290 turns on the relay switch SWR to prevent a current from flowing into a NTC thermistor. At this point, whether a power factor correction circuit reaches a steady state is determined according to whether a predetermined reference time elapses. In the case of the power factor correction circuit 200, since a steady state is usually reached within seconds, the reference time may be set to a time of 2 sec to 3 sec.

According to the embodiment of FIG. 5, under the ideal situation that the relay switch SWR has no resistance value, unlike the embodiment of FIG. 2, when a circuit does not enter a steady state, no current flows into the NTC thermistor Rn1. As a result, power loss does not occur. However, in an actual circuit including the relay switch SWR having a self resistance component, even if the relay switch SWR is turned on, some current flows into the NTC thermistor Rn1. As a result, power loss occurs. In order to completely prevent such power loss, one relay switch is connected to one end of the NTC thermistor Rn1. Then, the relay switch is turned on when inrush current flows into a circuit and is turned off when the circuit enters a steady state. However, if the relay switch is added as described above, additional cost is required and the volume of the circuit is increased. Moreover, since the switch SWR requires a mechanical contact point, its lifetime is limited. Also, when the relay switch SWR operates at a high temperature environment such as a power converter, the reliability in operation and lifetime is low.

Figure 6:
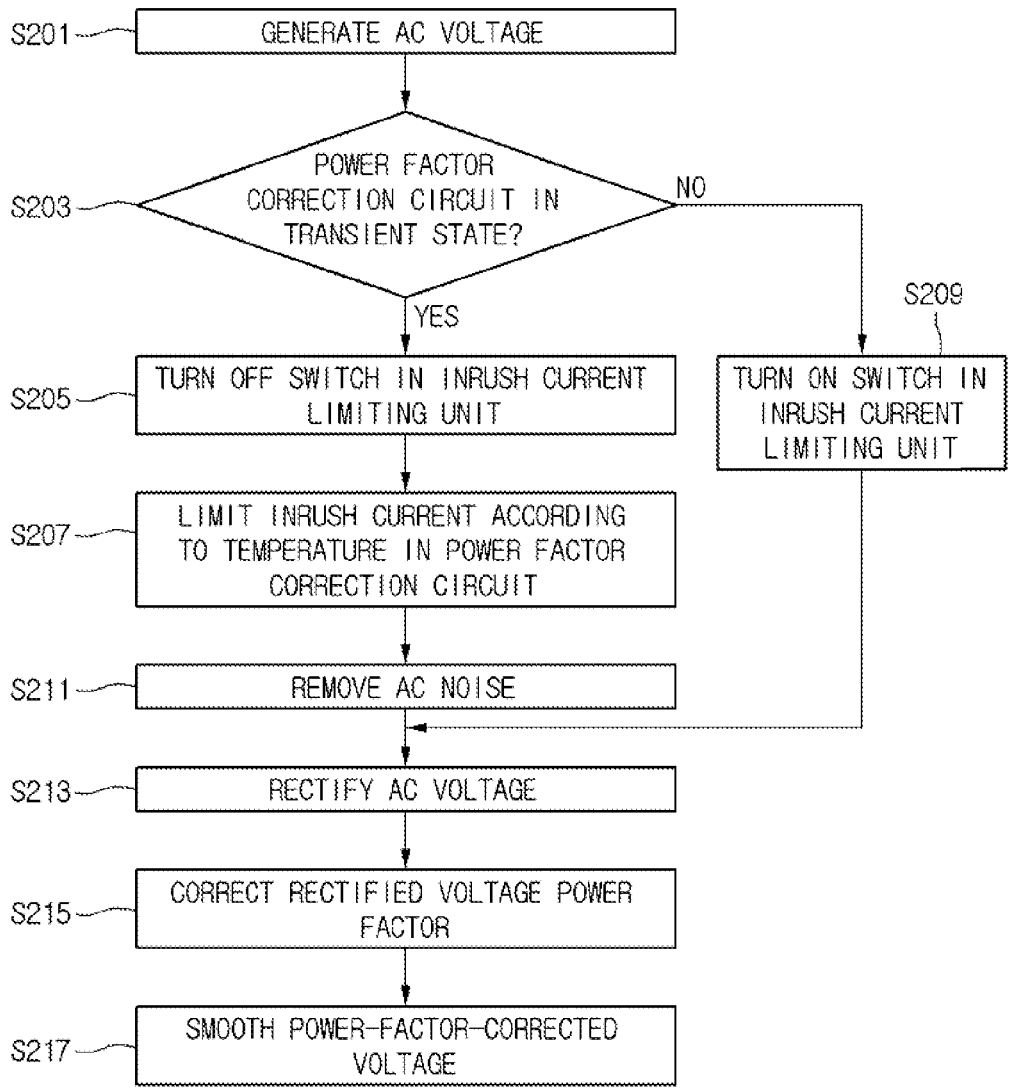
FIG. 6 is a flowchart illustrating operations of a power factor correction circuit according to another embodiment of the present invention.

FIG. 6 is a flowchart illustrating operations of a power factor correction circuit according to another embodiment of the present invention.

The AC voltage generation unit 210 generates AC voltage in operation S201.

The control signal generation unit for inrush current limiting unit 290 determines whether the power factor correction circuit 200 is in a transient state in operation S203. The transient state refers to a state prior to entering a steady state, i.e., a state in which a circuit shows a transient response.

If the power factor correction circuit 200 is in a transient state, the control signal generation unit for inrush current limiting unit 290 generates a control signal to turn off a switch in the inrush current limiting unit 220 in operation S205.

If the switch in the inrush current limiting unit 220 is turned on, the inrush current limiting unit 220 limits inrush current according to a temperature in a circuit in operation S207.

If the power factor correction circuit 200 is in a steady state, the control signal generation unit for inrush current limiting unit 290 generates a control signal to turn off a switch in the inrush current limiting unit 220 in operation S209.

The AC noise removing unit 230 removes the noise of AC voltage in operation S211.

The rectifying unit 240 rectifies an AC voltage having noise removed to generate the rectified voltage in operation S213.

The power factor correction unit 250 generates a power-factor-corrected voltage by power-factor-correcting the rectified voltage in operation S215.

The smoothing unit 260 smoothes the power-factor-corrected voltage in operation S217.

Hereinafter, a power factor correction circuit and design method according to another embodiment of the present invention will be described with reference to FIGS. 7 to 9.

Figure 7:
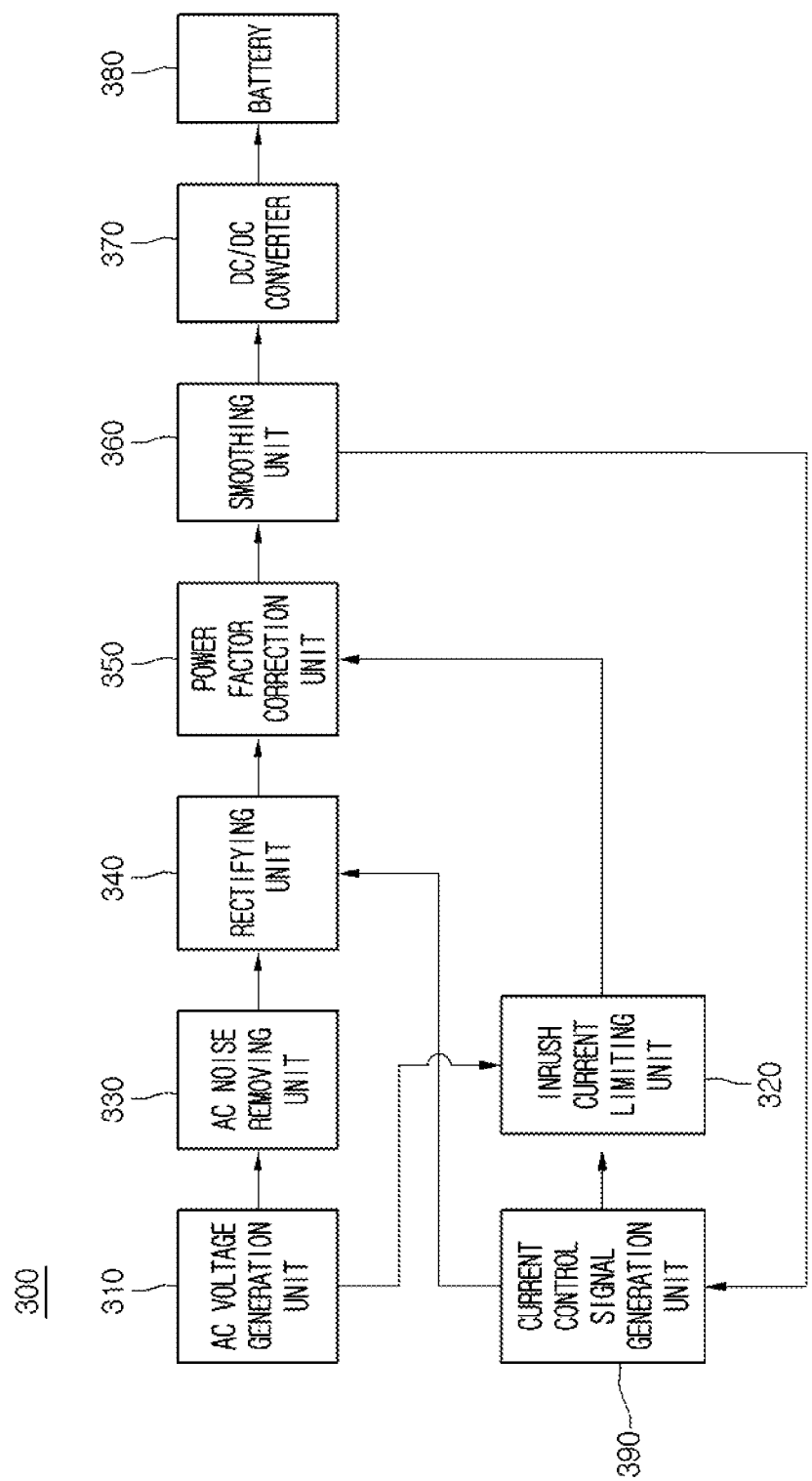
FIG. 7 is a block diagram illustrating a power factor correction circuit according to another embodiment of the present invention.

FIG. 7 is a block diagram illustrating a power factor correction circuit according to another embodiment of the present invention.

The power factor correction circuit 300 includes an AC voltage generation unit 310, an inrush current limiting unit 320, an AC noise removing unit 330, a rectifying unit 340, a power factor correction unit 350, a smoothing unit 360, a DC/DC converter 370, a battery 380, and a current control signal generation unit 390.

The inrush current limiting unit 320 limits an inrush current generated by AC voltage in a transient state and provides the limited inrush current to the smoothing unit 360, and then, stops providing the current in a steady state.

The rectifying unit 340 stops rectifying AC voltage in a transient state, and rectifies AC voltage in a steady state to generate the rectified voltage.

The current control signal generation unit 390 generates a signal for controlling the inflow current limiting unit 320 and the rectifying unit 340.

Other components of the power factor correction circuit 300 will be described in more detail with reference to FIG. 8.

Figure 8:
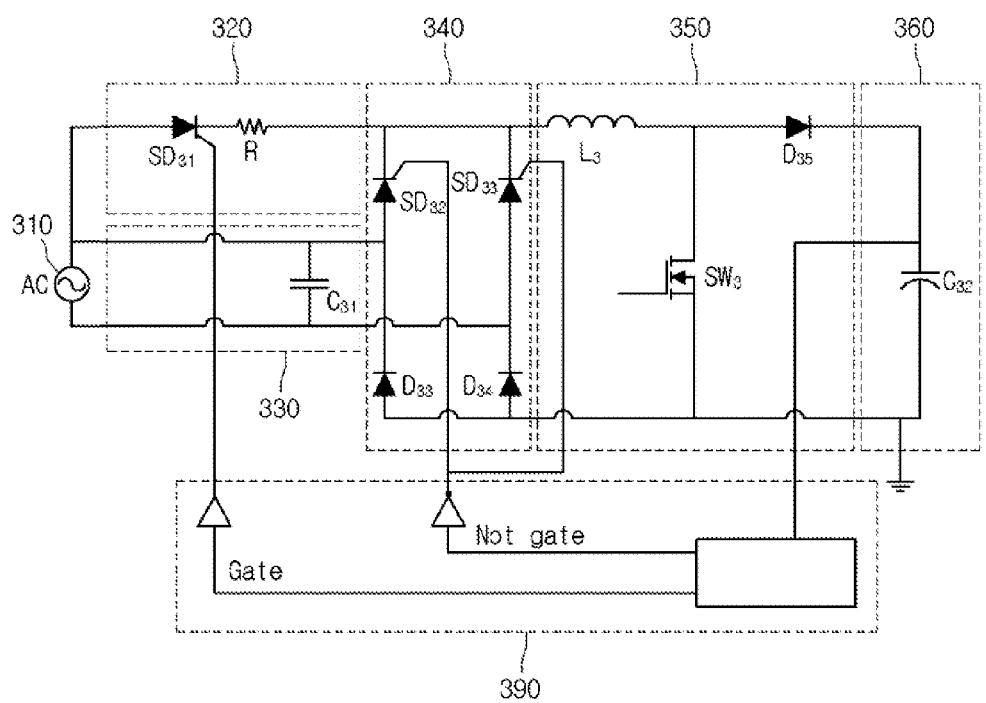
FIG. 8 is a circuit diagram illustrating a power factor correction circuit according to another embodiment of the present invention.

FIG. 8 is a circuit diagram illustrating a power factor correction circuit according to another embodiment of the present invention.

The AC voltage generation unit 310 generates AC voltage.

The inrush current limiting unit 320 includes a diode, a switch, and a resistor. The diode has one end to which AC voltage is applied. The switch is connected to the other end of the diode. The resistor R is connected to the other end of the switch.

Especially, the diode and the switch may be replaced with a silicon controlled rectifier (SCR) SD31 including functions of the diode and the switch. If the diode and the switch are replaced with the SCR SD31, the size of a device required for a circuit is reduced, so that the circuit may be miniaturized. Additionally, since the SCR SD31 guarantees a longer lifetime than a general switch, the lifetime of the circuit may be extended. Moreover, since the prices of the diode and the SCR SD31 have almost no difference, circuit manufacturing costs may be further reduced than using an additional switch.

When a circuit is in a transient state, that is, when the SCR SD31 is turned on, inrush current flows into the inrush current limiting unit 320. Since there is the resistor R in the inrush current limiting unit 320, compared to when the SCR SD31 is turned off, a total internal resistance value is increased in a power factor correction circuit. Accordingly, since the size of an internal resistance is increased, the size of current is reduced according to the Ohm's law (i.e., V=IR(V: voltage I: current R: resistance)), so that inrush current is limited.

When a circuit is in a steady state, that is, when the SCR SD31 is turned off, inrush current does not flow into the inrush current limiting unit 320. Accordingly, unlike the embodiments shown in FIGS. 1 to 6, power loss due to the inrush current limiting unit 320 in a steady state does not occur. Additionally, according to this embodiment, while a circuit operates in a steady state and then overcurrent flows due to an external factor, the SCR SD31 may be turned off again to protect the circuit.

The AC noise removing unit 330 includes a capacitor C31. An AC voltage generated at one end of the AC voltage generation unit 310 is applied to one end of the capacitor C31 and the other end of the capacitor C31 is connected to the other end of the AC voltage generation unit 310. The AC noise removing unit 330 removes the noise of AC voltage.

The rectifying unit 340 may include a plurality of diodes and a plurality of switches. According to the embodiment of FIG. 7, the rectifying unit 140 includes four diodes and two switches. A plurality of switches and a plurality of upper diodes connected to one end of the plurality of switches may be replaced with SCRs.

When an SCR is used instead of a switch and a diode, as mentioned above, a circuit may be miniaturized further than using the switch and the diode and may guarantee a relatively longer lifetime. Moreover, since the prices of the diode and the SCR have almost no difference, circuit manufacturing costs may be further reduced than using an additional switch.

The two diodes D33 and D34 and the two SCRs SD32 and SD33 are bridge-connected. The left diode D33 among the two diodes has one end connected to one end of the capacitor C31 of the AC noise removing unit 330 and the other end grounded. The right diode D34 among the two diodes has one end connected to the other end of the capacitor C31 of the AC noise removing unit 330 and the other end grounded. The left SCR SD32 among the two SCRs has one end connected to the other end of the resistor R of the inrush current limiting unit 320 and the other end connected to one end of the left diode D33. The right SCR SD33 among the two SCRs has one end connected to the other end of the resistor R of the inrush current limiting unit 320 and the other end connected to one end of the right diode D34.

In a transient state, that is, when the two SCRs SD32 and SD33 are turned off, current does not flow into the rectifying unit 340 and directly flows from the inrush current limiting unit 320 to the power factor correction unit 350. When the two SCRs SD32 and SD33 are turned on, current flows into the rectifying unit 340.

The rectifying unit 340 rectifies an AC voltage having noise removed to have the same polarity to generate the rectified voltage.

The power factor correction unit 350 includes an inductor L3, a MOSTET switch SW3, and a diode D35. One end of the inductor L3 is connected to one end of the right SCR of the rectifying unit 340. One end of the MOSFET switch SW3 is connected to the other end of the inductor L3 and the other end of the MOSFET switch SW3 is grounded. One end of the diode D35 is connected to the other end of the inductor L3. The power factor correction unit 350 may be specifically a booster converter. The booster converter performs switching repeatedly to maintain the size of a rectified voltage to be constant and make the phases of current and voltage identical. That is, the flow of current is adjusted through a method of allowing current to flow for a predetermined time and then stop for a predetermined time. Through such an operation for making the phase of voltage identical to the phase of current, a power factor is corrected.

The smoothing unit 360 includes one capacitor C32. Especially, the capacitor C32 may be an electrolytic condenser. One end of the capacitor C32 is connected to the other end of the diode D35 and the other end of the capacitor C12 is grounded. According to an embodiment of the present invention, the smoothing unit 360 may include a plurality of capacitors. One end of each of the plurality of capacitors is connected to the other end of the diode D35 and the other end of each of the plurality of capacitors is grounded. The smoothing unit 360 generates DC voltage by removing a ripple from the power-factor-corrected voltage.

FIG. 9 is a flowchart illustrating operations of a power factor correction circuit according to another embodiment of the present invention.

The AC voltage generation unit 310 generates AC voltage in operation S301.

The current control signal generation unit 390 determines whether the power factor correction circuit 300 is in a transient state in operation S303. When the power factor correction circuit 300 reaches a steady state, inrush current may not occur.

Especially, a steady state may be determined according to an elapsed time after AC voltage is applied like the embodiment of FIG. 6. Since the power factor correction circuit 300 reaches a steady state within seconds after AC voltage is applied, the reference time of a steady state may be set to a time of 2 sec to 3 sec. If the steady state is determined through such a method, it may not be determined precisely.

In order to precisely determine whether a power factor correction circuit is in a steady state, whether the power factor correction circuit is in a steady state may be determined based on a voltage value applied to one end of the capacitor C32 in the smoothing unit 360. Especially, whether the power factor correction circuit is in a steady state may be determined based on whether a voltage value applied to one end of the capacitor C32 charged with electronic charges is equal to or greater than a reference voltage. When a predetermined amount of electric charges are charged in the capacitor C32, inrush current does not occur. The reference voltage may be several times the root mean square (RMS) of an AC voltage that the AC voltage generation unit 310 generates.

If the power factor correction circuit 300 is in a transient state, the current control signal generation unit 390 generates a control signal to allow current into the inrush current limiting unit 320 in operation S305. That is, the current control signal generation unit 390 generates a control signal to turn on a switch in the inrush current limiting unit 320 and turn off a switch in the rectifying unit 340. Since the inrush current limiting unit 320 is connected, inrush current flows into the inrush current limiting unit 320 and is limited.

If the power factor correction circuit 300 is in a steady state, the current control signal generation unit 390 stops the current flowing into the inrush current limiting unit 320 in operation S307. That is, the current control signal generation unit 390 generates a control signal to turn off a switch in the inrush current limiting unit 320 and turn on a switch in the rectifying unit 340.

When the power factor correction circuit 300 is in a steady state, the AC noise removing unit 330 removes the noise of AC voltage in operation S309.

If the power factor circuit 300 is in a steady state, the rectifying unit 340 rectifies an AC voltage having noise removed to generate the rectified voltage in operation S311.

The power factor correction unit 350 generates a power-factor-corrected voltage in operation S313.

The smoothing unit 360 smoothes the power-factor-corrected voltage in operation S315.

The features, structures, and effects described above are included in at least one embodiment of the present invention and are not necessarily limited to one embodiment. Furthermore, the features, structures, and effects described in each embodiment may be combined or modified for another embodiment by those skilled in the art. Accordingly, it should be understood that contents relating to such a combination and modification are included in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power factor correction circuit correcting a power factor of AC voltage, comprising:
    an AC noise removing unit for removing a noise of AC voltage,
    a rectifying unit rectifying the AC voltage having noise removed to have the same polarity;
    a power factor correction unit generating a power-factor-corrected voltage by correcting the rectified voltage;
    a smoothing unit generating a smoothed voltage by smoothing the power-factor-corrected voltage;
    an inrush current limiting unit providing a limited current by limiting an inrush current generated by the AC voltage in a transient state and stopping providing a current to the smoothing unit;
    a current control signal generation unit for generating a current control signal for controlling the rectifying unit and the inrush current limiting unit;
    wherein the current control signal generation unit controls a current flow to the inrush current limiting unit according to whether the power factor correction circuit is in a steady state,
    wherein the current control signal generation unit prevents a current flow to the inrush current limiting unit by determining that the power factor correction circuit is in the steady state when a value of the smoothed voltage is equal to or greater than a reference voltage value,
    wherein the current control signal generation unit allows a current flow to the inrush current limiting unit by determining the power factor correction circuit is in the transient state when the value of the smoothed voltage is less than the reference voltage value.

2. The circuit of claim 1, wherein the current control signal generation unit generates the current control signal on the basis of a value of the power-factor-corrected voltage applied to one end of one capacitor or a plurality of capacitors connected in parallel.

3. The circuit of claim 1, wherein the inrush current limiting unit comprises a silicon controlled rectifier (SCR) and the rectifying unit comprises an SCR.

4. The circuit of claim 3, wherein the current control signal generation unit generates a control signal when the power factor correction circuit is in the steady state to turn off the SCR in the inrush current limiting unit and turn on the SCR in the rectifying unit.

5. The circuit of claim 3, wherein the current control signal generation unit generates a control signal when the power factor correction circuit is in the transient state to turn on the SCR in the inrush current limiting unit and turn off the SCR in the rectifying unit.

6. A power factor correction circuit comprising:
    a capacitor for removing an AC noise;
    a plurality of bridge diodes;
    a power factor correction unit having an input terminal connected to an output terminal of the plurality of bridge diodes;
    a smoothing capacitor having one end connected to an output terminal of the power factor correction unit;
    a switch having one end to which AC voltage is applied;
    a diode having one end connected to the other end of the switch;
    a resistor having one end connected to the other end of the diode; and
    a current control signal generation unit for generating a current control signal for controlling the rectifying unit and an inrush current limiting unit;
    wherein the current control signal generation unit controlling a current flow to the inrush current limiting unit according to whether the power factor correction circuit is in a steady state,
    wherein the current control signal generation unit prevents a current flow to the inrush current limiting unit by determining that the power factor correction circuit is in the steady state when a value of the smoothed voltage is equal to or greater than a reference voltage value,
    wherein the current control signal generation unit allows a current flow to the inrush current limiting unit by determining the power factor correction circuit is in a transient state when the value of the smoothed voltage is less than the reference voltage value.

7. The circuit of claim 6, wherein the current control signal generation unit generates a current control signal on a basis of a voltage value applied to one end of the smoothing capacitor connected to an output terminal of the power factor correction unit.

8. The circuit of claim 7, wherein the current control signal generation unit determines that the power factor correction circuit is in the transient state when a voltage value applied to one end of the smoothing capacitor connected to the output terminal of the power factor correction unit is less than a reference voltage value.

9. The circuit of claim 6, wherein the switch and the diode are SCRs.

10. A method of operating a power factor correction circuit correcting a power factor of AC voltage, the method comprising:

determining whether the power factor correction circuit is in a transient state;

limiting an inrush current generated by the AC voltage when the power factor correction circuit in the transient state;

generating a rectified voltage by rectifying the AC voltage when the power factor correction circuit is in a steady state;

generating a power-factor-corrected voltage by power-factor-correcting the rectified voltage; and generating a smoothed voltage by smoothing the power-factor-corrected voltage;

controlling whether to limit the inrush current according to whether the power factor correction circuit is in the steady state by generating a current control signal, wherein the determining of whether the power factor correction circuit is in the transient state comprises determining that the power factor correction circuit is in the steady state when a value of the smoothed voltage is equal to or greater than a reference voltage value.

11. The method of claim 10, wherein the controlling whether to limit the inrush current comprises generating the current control signal on a basis of a value of the power-factor-corrected voltage applied to one end of one capacitor or a plurality of capacitors connected in parallel.

12. The method of claim 10, wherein the limiting of the inrush current comprises using a first SCR and the generating of the rectified voltage comprises using a second SCR.

13. The method of claim 12, wherein the generating of the rectified voltage by rectifying the AC voltage comprises:

turning off the first SCR; and turning on the second SCR.

14. The method of claim 12, wherein the limiting of the inrush current comprises:

turning on the first SCR; and turning off the second SCR.

* * * * *